United States Patent

Musser et al.

[11] Patent Number: 4,467,819
[45] Date of Patent: Aug. 28, 1984

[54] COMBINED STONE TRAP CLOSING MECHANISM

[75] Inventors: Glenn A. Musser; Stuart O. Swiler; Larimer J. Knepper, all of New Holland, Pa.

[73] Assignee: Sperry Corporation, New Holland, Pa.

[21] Appl. No.: 534,998

[22] Filed: Sep. 22, 1983

[51] Int. Cl.³ .............................................. A01F 12/16
[52] U.S. Cl. ................................... 130/27 JT; 56/10.2
[58] Field of Search ............... 56/10.2, 14.6, DIG. 15; 130/27 JT, 27 B, 27 AB

[56] References Cited

U.S. PATENT DOCUMENTS

| | | | |
|---|---|---|---|
| 3,454,014 | 8/1969 | Blumhardt | 130/27 JT |
| 3,756,248 | 9/1973 | Mathews | 130/27 JT |
| 4,335,565 | 6/1982 | Knepper et al. | 130/27 JT |
| 4,343,137 | 8/1982 | Seymour | 130/27 JT |

FOREIGN PATENT DOCUMENTS 2524435 12/1975 Fed. Rep. of Germany ... 130/27 JT
1400055 8/1975 United Kingdom ............ 130/27 JT Primary Examiner—Jay N. Eskovitz
Assistant Examiner—John G. Weiss
Attorney, Agent, or Firm—Larry W. Miller; Frank A. Seemar; Darrell F. Marquette

[57] ABSTRACT

A closing mechanism for the trap door of a stone trap mounted in the floor of the feeder house on a combine harvester is disclosed wherein the trap door can be moved from a opened position to a closed position by the raising of the header. If the stone trap door has been opened for the ejection of non-crop material within the flow of crop material within the feeder house, a link interconnecting the trap door and the frame of the combine effects a pivotal movement of the trap door to its closed position upon actuation of the header lift cylinders to raise the feeder house and attached header above the ground. The link includes a spring to permit extension of the link should the feeder house be raised above a position necessary to affect the closing of the trap door.

20 Claims, 2 Drawing Figures

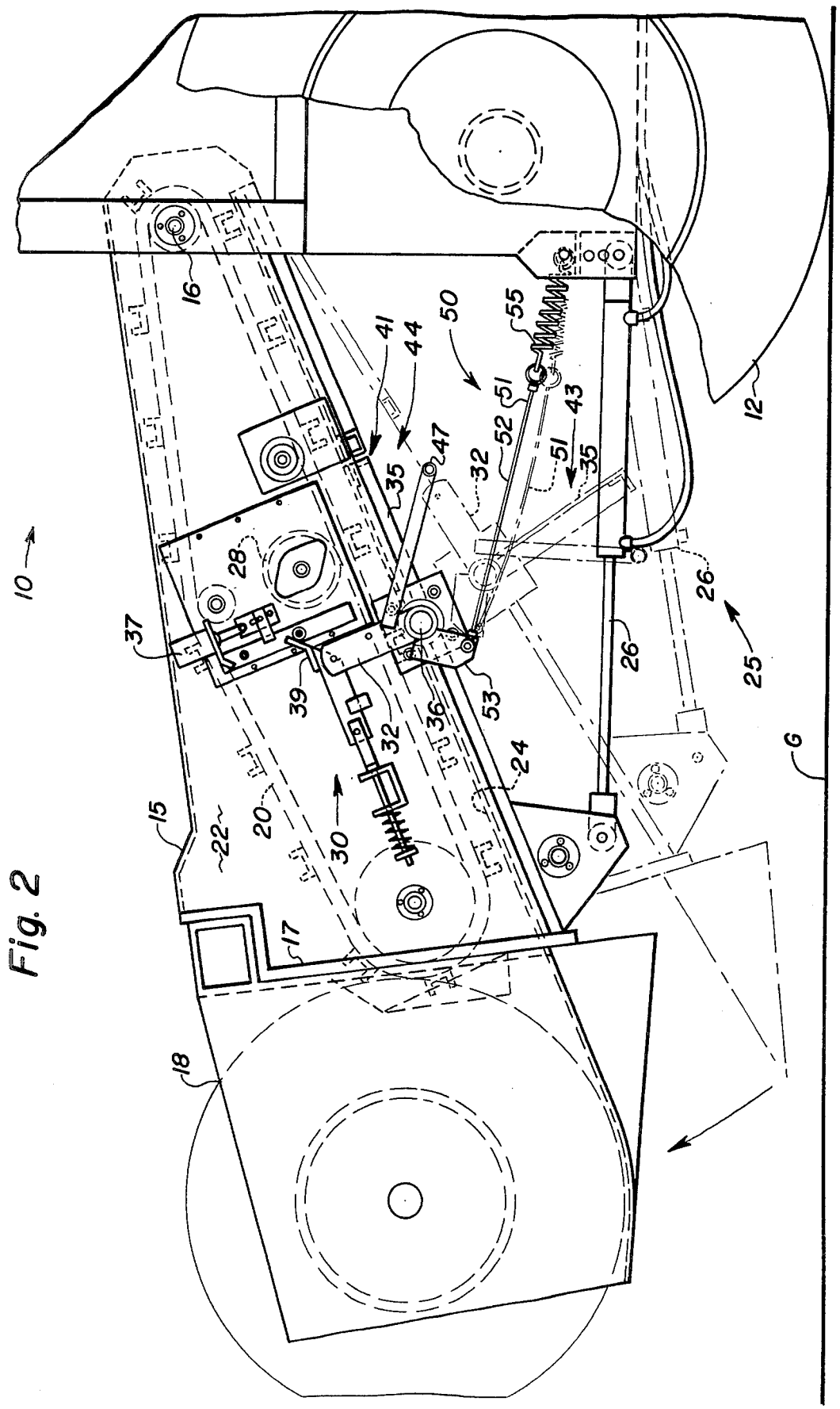

COMBINED STONE TRAP CLOSING MECHANISM

BACKGROUND OF THE INVENTION

The present invention relates generally to combine harvesters and, more particularly, to improvements in the stone trap mounted in the floor of the combine feeder house.

Stone traps, such as those seen in U.S. Pat. No. 4,335,565 issued to L. J. Knepper et al, on Jun. 22, 1982, can be actuated either electronically or mechanically. Once the presence of non-crop material, such as stones and other non-frangible material, the trap door is released to open a hole in the floor of the feeder house for the ejection of the non-crop material from the combine harvester. However, once the trap door was opened, it was necessary for the operator of the combine to stop operation of the machine, climb down from the cab mounted above the header for observation of the crop harvesting process and manually close the trap door to permit continued operation of the combine.

To satisfactorily overcome this problem, it would be necessary to provide a closing mechanism that would be simple to operate and have a low cost. Accordingly, devices such as an electric motor for powering the pivotal rotation of the trap door from its opened position to its closed position would be unacceptable because of the high cost factor. Furthermore, movement of the feeder house and header relative to the ground and/or portions of the frame of the combine have been provided by the hydraulic header lift cylinders interconnecting the feeder house and the combine main frame.

SUMMARY OF THE INVENTION

It is an object of this invention to overcome the aforementioned disadvantages of the prior art by providing a closing mechanism for the stone trap door on a combine harvester that utilizes the lifting action of the hydraulic header lift cylinders to affect the closing of the trap door.

It is another object of this invention to facilitate the closing of the stone trap door after ejection of non-crop material from the flow of crop material through the feeder house of the combine.

It is still another object of this invention to permit the operator of a combine harvester to close the stone trap door without requiring the operator to leave the operating controls of the combine.

It is an advantage of this invention that the operator does not have to manually reset the stone trap door into its closed position.

It is a feature of this invention that the closing mechanism does not interfere with the movement of the stone trap door from its closed position to its opened position.

It is yet another object of this invention to utilize the hydraulic lifting action of the header lift cylinders to effect a closing of the stone trap door.

It is another feature of this invention that the closing mechanism is easily adaptable to any combine having a stone trap door pivotally mounted in the floor intermediate the ends of the feeder house.

It is a further object of this invention to provide a means for protection of the stone trap and closing mechanism components should the feeder house be raised beyond the position necessary to effect a closing of the trap door.

It is another advantage of this invention that a spring can provide an extension of the length of the flexible link interconnecting the stone trap at the frame of the combine to prevent damage to any of the components.

It is still a further object of this invention to provide a closing mechanism for the stone trap door of a combine harvester which is durable in construction, inexpensive of manufacture, carefree of maintenance, facile in assemblage, and simple and effective in use.

These and other objects, features and advantages are accomplished according to the instant invention by providing a closing mechanism for the trap door of a stone trap mounted in the floor of the feeder house on a combine harvester wherein the trap door can be moved from a opened position to a closed position by the raising of the header. If the stone trap door has been opened for the ejection of non-crop material or even slugs of crop material within the flow of crop through the feeder house, a link interconnecting the trap door and the frame of the combine effects a pivotal movement of the trap door to its closed position upon actuation of the header lift cylinders to raise the feeder house and attached header above the ground. The link includes a spring to permit extension of the link should the feeder house be raised above a position necessary to affect the closing of the trap door.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a partial side elevational view of a combine harvester showing the feeder house similar to that seen in FIG. 1, but with the feeder house being raised to effect a closing of the stone trap door, the position of the feeder house in its lowered position with the stone trap door in an opened position being shown in phantom.

DETAILED DESCRIPTION OF THE PREFERRED EMBODIMENT

Figure 1:
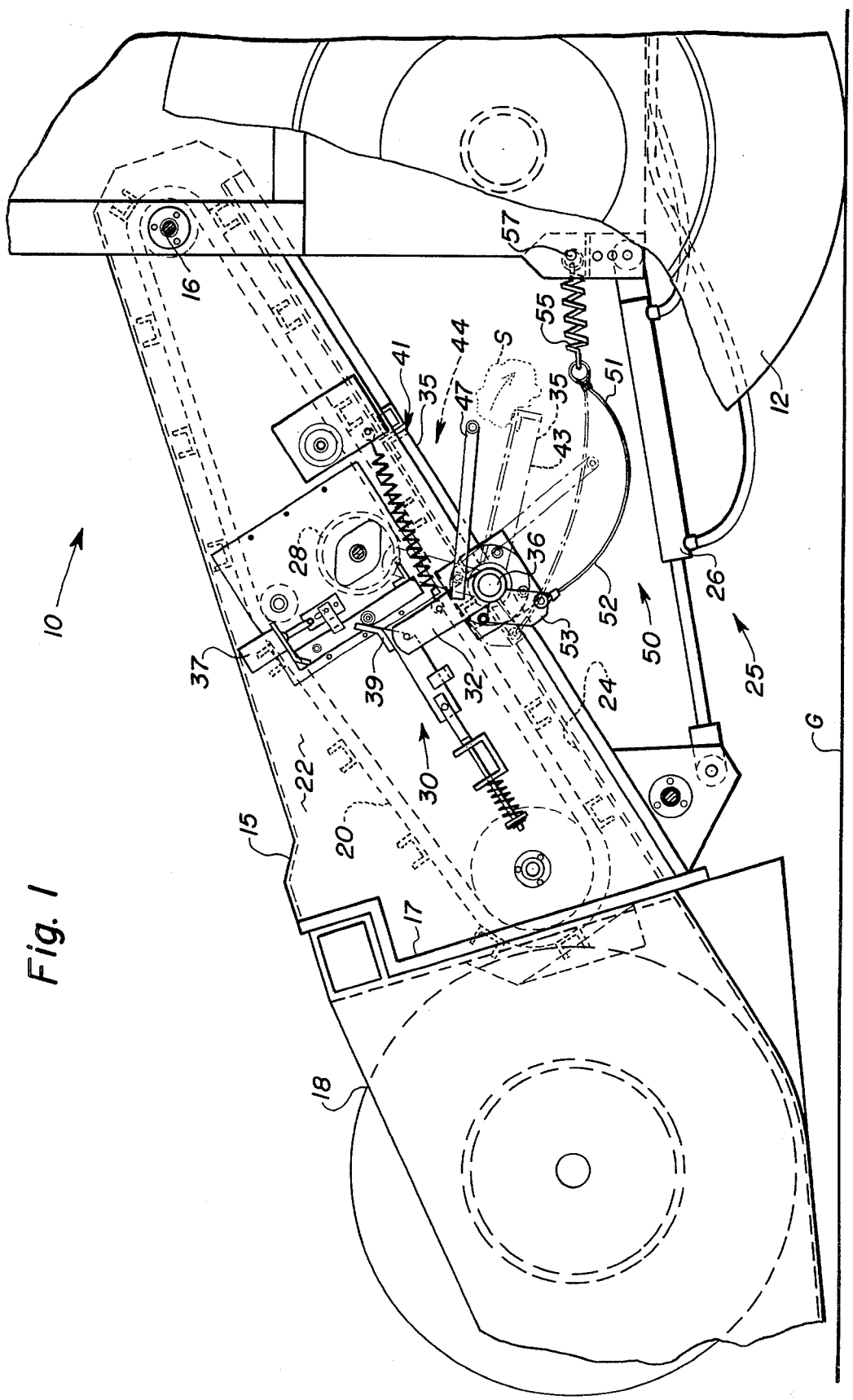
FIG. 1 is a fragmentary side elevational view of a combine harvester showing the feeder house in its normal operating position, the opened position of the stone trap door for ejection of non-crop material from the feeder house being shown in phantom, the drive components being removed for clarity.

Referring now to the drawings, particularly FIG. 1, a fragmentary side elevational view of a combine harvester, showing the feeder house, can be seen. The combine 10 includes a wheeled frame 12 supporting a threshing mechanism (not shown), as is well known in the art, for harvesting crop material. The feeder house 15 is pivotally connected to the frame 12 by the pivot 16 and is operable to convey crop material to the threshing mechanism (not shown). The crop harvesting header 18 is attached to the forward end 17 of the feeder house 15 and is operable to collect crop material from the field or ground G, initiating the crop harvesting process, and deliver the collected crop material to the feeder house 15 for conveyance to the threshing mechanism.

The feeder house 15 is a hollow conduit housing a conveyor 20 operable between opposing side sheets 22 to convey crop material along the floor 24 for delivery of the crop material rearwardly into the threshing mechanism (not shown). A header lift mechanism 25, including a hydraulic cylinder 26 interconnecting the frame 12 and the feeder house 15, is operable to vertically move the feeder house and the attached header about the pivot 16, raising and lowering the header 18 and feeder house 15 relative to the ground G.

As is described in greater detail in U.S. Pat. No. 4,335,565 granted to L. J. Knepper et al on Jun. 22, 1982, the presence of non-crop material can be detected electronically through a sensing mechanism (not shown) or mechanically through the stone roll 28. The ejection mechanim 30 will affect a releasing of the latch 32 of the trap door 35 either through operation of a solenoid 37 or the mechanical cam control 39 when the presence of non-crop material is appropriately detected. Once the latch 32 has been released, the trap door 35, which is pivotally connected to the floor 24 by the pivot 36, is permitted to move pivotably from a closed position 41, seen in FIGS. 1 and 2 in solid lines, to an opened position, seen in phantom in FIGS. 1 and 2, by gravity. As is seen in phantom in FIG. 1, a stone S or other non-frangible non-crop material can be ejected from the feeder house 15 through the opening 44 created in the floor 24 by the opened trap door 35.

Although a handle 47 is affixed to the trap door 35 for manual operation thereof, it is desirable to provide a mechanism 50 to affect a closing of the trap door 35 without the operator having to leave his position of operation of the combine 10. The cable 52 is connected to a mounting tab 53 affixed to the trap door 35 to be movable therewith and to a spring 55 which in turn is connected to the frame 12 at a connecting point 57. As is best seen in FIG. 1, the distance between the mounting tab 53 and the connecting point 57 is less than the length of the link 51 between the trap door 35 and the frame 12 formed by the cable 52 and the spring 55, when the header 18 and feeder house 15 are in the lowered position seen in FIG. 1. As is seen in phantom in FIG. 1, the distance between the mounting tab 53 and the connecting point 57 is still less than the length of the link 51 when the trap door 35 moves into its opened position 43, so long as the feeder house 15 remains in its lowered position. Accordingly, the link 51 would not restrict movement of the trap door 35 from its closed position 41 to its opened position 43.

Referring to FIG. 2, the opened position 43 of the trap door 35, while the feeder house 15 is in its lowered position can be seen in phantom. To affect a closing of the trap door 35, it is only necessary for the operator to extend the hydraulic cylinder 26 to raise the feeder house 15 and attached header 18 to a raised position, causing the distance between the pivot 36 and the connecting point 57 to increase. Since the length of the link 51 is substantially fixed, a rotation of the trap door 35 about its pivot 36 is affected because the distance between the mounting tab 53 and the connecting point 57 is not permitted to increase. Once the trap door 35 has been moved back into its closed position 41, the latch 32 is reengaged and the trap door 35 will remain in the closed position 41 until another stone or other non-crop material is detected.

By choosing a spring 55 that requires a pivot force greater than the weight of the trap door 35 to which the link 51 is connected, the length of the link 51 will be substantially fixed during normal operation of the closing mechanism 50. However, should the hydraulic cylinder 26 be extended to raise the feeder house 15 beyond the position necessary to affect a closing of the trap door 35, the spring 55 can extend to increase the effective length of the link 51 until the feeder house 15 has been lowered until the distance between the mounting tab 53 and the connecting point 57 is equal to or less than the relaxed length of the link 51. Accordingly, the spring 55 protects the components of the closing mechanism 50 and the trap door 35. By using the hydraulic lifting action of the cylinders 26 to raise and lower the feeder house 15 to also affect a closing of the trap door 35, a simple, efficiently operated and inexpensive closing mechanism 50 can be provided.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention, however, concepts, as based upon the description, may be employed in other embodiments without departing from the scope of the invention. Accordingly, the following claims are intended to protect the invention broadly, as well as in the specific form shown.

Having thus described the invention, what is claimed is:

1. In a combine harvester having a mobile frame adapted for movement across a field; threshing means mounted on said frame for threshing crop material; a feeder house pivotally connected to said frame to convey crop material to said threshing means, said feeder house including a floor and an elevator cooperable with said floor to convey crop material to said threshing means, said floor having a trap door pivotally movable from a closed position in which said trap door and said floor form a surface over which said elevator conveys said crop material and an opened position in which an opening is made in said floor to expel crop material from within said feeder house; detection means for detecting the presence of non-crop material within the flow of crop material over the surface formed by said floor and said trap door, ejection means operatively connected to said detection means and said trap door to effect a movement of said trap door from said closed position to said opened position upon the detection of non-crop material and permit the ejection thereof through said opening; a crop harvesting header connected to said feeder house for collecting crop material and discharging said collected crop material into said feeder house; and header lift means interconnecting said frame and said feeder house for selectively raising said feeder house and said attached header by pivoting said feeder house about the pivotal connection with said frame from a lowered position to a raised position, the improvement comprising:

closing means operatively connected to said trap door to effect a movement of said trap door from said opened position to said closed position upon actuation of said header lift means to raise said feeder house and attached header.

2. The combine harvester of claim 1 wherein said header lift means includes a hydraulic cylinder interconnecting said frame and said feeder house at a connection point remote from the pivotal connection of said feeder house with said frame.

3. The combine harvester of claim 2 wherein said closing means includes a link having a first length interconnecting said trap door and said frame at a connecting point.

4. The combine harvester of claim 3 wherein said link is connected to a mounting tab affixed to said trap door to be movable therewith.

5. The combine harvester of claim 4 wherein said trap door is pivotally mounted such that the distance from said mounting tab to said frame connecting point increases as said trap door moves from said closed position to said opened position.

6. The combine harvester of claim 5 wherein said link is constructed so as to permit the increase in distance from said mounting tab to said frame connecting point as said trap door moves from said closed position to said opened position without significantly restricting the movement of said trap door.

7. The combine harvester of claim 6 wherein the distance between said mounting tab and said frame mounting point is limited by the first length of said link as said feeder house is moved by said header lift means from said lowered position to said raised position, causing said trap door to pivotally move from said opened position to said closed position as said feeder house is moved toward said raised position.

8. The combine harvester of claim 7 wherein said link includes a flexible member and a spring, said spring permitting an increase in length of said link above said first length to accommodate a vertical movement of said feeder house above the raised position necessary to effect a closing of said trap door.

9. A crop harvesting machine for harvesting crop material gathered from a field, comprising:
   a mobile frame adapted for movement across the field;
   a harvesting mechanism supported on said frame for harvesting crop material;
   a crop harvesting header forwardly supported from said frame to gather crop material from the field to initiate the crop harvesting process;
   a conduit interconnecting said header and said harvesting mechanism for the passage of crop material from said header to said harvesting mechanism, said conduit including a floor having an opening therein;
   a trap door pivotally mounted on said floor adjacent said opening for movement between a closed position in which said opening is closed to create a continuous surface over said floor and said trap door for the uninterrupted movement of crop material through said conduit from said header to said harvesting mechanism and an opened position to permit crop material to pass through said opening and interrupt the flow of crop material from said header to said harvesting mechanism;
   a conveyor operably housed within said conduit to convey crop material along said floor from said header toward said harvesting mechanism, said conveyor expelling crop material from said conduit through said opening when said trap door is moved to said opened position;
   means for moving said trap door from said closed position to said opened position;
   lift means connected to said conduit to effect a generally vertical movement of said conduit from a lowered position to a raised position; and
   closing means operatively associated with said lift means to effect a movement of said trap door from said opened position to said closed position when said conduit is moved from said lowered position to said raised position.

10. The crop harvesting machine of claim 9 wherein said closing means includes a flexible link interconnecting said trap door and said mobile frame, said link causing a pivotal movement of said trap door from said opened position to said closed position as said conduit is moved toward said raised position.

11. The crop harvesting machine of claim 10 wherein said conduit is pivotally connected to said frame, said lift means including a hydraulic cylinder interconnecting said conduit and said frame to cause a pivotal movement of said conduit between said raised and lowered positions.

12. The crop harvesting machine of claim 11 wherein said trap door includes a mounting tab affixed thereto for movement therewith, said link interconnecting said mounting tab and a frame connecting point, said trap door being mounted such that the distance between said mounting tab and said frame connecting point increases as said trap door moves from said closed position to said opened position.

13. The crop harvesting machine of claim 12 wherein said link includes a flexible member and a spring, said spring permitting an increase in length of said link when said conduit is raised above the raised position necessary to effect a movement of said trap door to said closed position.

14. The crop harvesting machine of claim 13 wherein said means for moving said trap door includes a latching mechanism for securing said trap door in said closed position and release means for releasing said latching mechanism to permit said trap door to move to said opened position.

15. In a combine harvester having a mobile frame adapted for movement across a field; threshing means mounted on said frame for threshing crop material; a feeder house pivotally connected to said frame to convey crop material to said threshing means, said feeder house including a floor and an elevator cooperable with said floor to convey crop material to said threshing means, said floor having a trap door mounted thereto by a pivot such that said trap door is pivotally movable between a closed position in which said trap door and said floor form a surface over which said elevator conveys said crop material and an opened position in which an opening is made in said floor to expel crop material from within said feeder house; latching means for releasably holding said trap door in said closed position; release means operatively connected to said latching means to effect a movement of said trap door from said closed position to said opened position; a crop harvester header connected to said feeder house for collecting crop material and discharging said collected crop material into said feeder house; and header lift means interconnecting said frame and said feeder house for selectively raising said feeder house and said attached header by pivoting said feeder house about the pivotal connection with said frame from a lowered position to a raised position, the improvement comprising:
   a flexible link having a first length interconnecting said trap door and said frame at a frame connecting point to effect a movement of said trap door from said opened position to said closed position when said header lift means moves said feeder house and attached header from said lowered position to said raised position.

16. The combine harvester of claim 15 wherein said flexible link includes a flexible member and a spring, said spring permitting the length of said link to increase beyond said first length when said feederhouse is moved above said raised position.

17. The combine harvester of claim 16 wherein the distance said trap door pivot and said frame connecting point increases as said feeder house is moved from said lowered position to said raised position.

18. The combine harvester of claim 17 wherein said trap door further includes a mounting tab for connection with said flexible link, said trap door being mounted such that the distance between said mounting tab and the connection point of said link to said frame increases as said trap door moves from said closed position to said opened position.

19. The combine harvester of claim 18 wherein the distance from said mounting tab to said frame connecting point is limited by said link, causing a rotation of said trap door about said trap door pivot to effect a movement of said trap door from said opened position toward said closed position as said feeder house is moved from said lowered position toward said raised position.

20. The combine harvester of claim 19 wherein said flexible member is a cable extending from said mounting tab to said spring.

* * * * *